United States Patent
Sung et al.

(10) Patent No.: US 11,462,966 B2
(45) Date of Patent: Oct. 4, 2022

(54) MOTOR

(71) Applicant: LG Magna e-Powertrain Co., Ltd., Incheon (KR)

(72) Inventors: Wonjung Sung, Seoul (KR); Yangsoo Lee, Seoul (KR); Hojun Shin, Seoul (KR); Kyeonghwan Kim, Seoul (KR); Gyeongjae Park, Seoul (KR); Junho Ahn, Seoul (KR)

(73) Assignee: LG MAGNA E-POWERTRAIN CO., LTD., Incheon (KR)

( * ) Notice: Subject to any disclaimer, the term of this patent is extended or adjusted under 35 U.S.C. 154(b) by 348 days.

(21) Appl. No.: 16/736,062

(22) Filed: Jan. 7, 2020

(65) Prior Publication Data

US 2020/0227971 A1 Jul. 16, 2020

(30) Foreign Application Priority Data

Jan. 10, 2019 (KR) .................. 10-2019-0003467

(51) Int. Cl.
  *H02K 5/22* (2006.01)
  *H02K 3/28* (2006.01)
  *B60W 10/08* (2006.01)

(52) U.S. Cl.
  CPC .............. *H02K 5/225* (2013.01); *H02K 3/28* (2013.01); *B60W 10/08* (2013.01)

(58) Field of Classification Search
  CPC .................................. H02K 5/225; H02K 3/28
  See application file for complete search history.

(56) References Cited

U.S. PATENT DOCUMENTS

| | | | | |
|---|---|---|---|---|
| 4,340,829 A * | 7/1982 | McCoy | .................. | H02K 3/522 310/194 |
| 5,175,458 A * | 12/1992 | Lemmer | ................ | H02K 5/225 310/71 |
| 6,825,586 B2 * | 11/2004 | Edrington | ................ | H02K 9/19 310/71 |
| 7,633,198 B2 * | 12/2009 | Kirkman | .............. | H02K 11/046 310/71 |
| 9,067,546 B2 * | 6/2015 | Meyer | ..................... | B60R 16/03 |
| 10,855,130 B2 * | 12/2020 | Kim | ....................... | H02K 3/522 |
| 10,873,168 B2 * | 12/2020 | Lee | ........................ | H01R 13/113 |
| 10,965,056 B2 * | 3/2021 | Siddiqui | ............. | H01R 13/521 |
| 11,152,833 B2 * | 10/2021 | Francis | ................... | H01R 9/223 |
| 2005/0034294 A1 * | 2/2005 | Edrington | ................ | H02K 9/19 29/596 |
| 2013/0252479 A1 * | 9/2013 | Ramey | ................ | H01R 13/516 29/874 |
| 2020/0227971 A1 * | 7/2020 | Sung | ........................ | H02K 3/28 |
| 2021/0210877 A1 * | 7/2021 | Patel | ..................... | H01R 43/24 |

* cited by examiner

*Primary Examiner* — Robert W Horn
(74) *Attorney, Agent, or Firm* — Birch, Stewart, Kolasch & Birch, LLP

(57) ABSTRACT

The present disclosure provides a motor configured to receive driving power from a connector including power terminals. The motor comprises a housing, a terminal block disposed inside the housing, and at least one terminal located adjacent to the terminal block. The power terminals are configured to penetrate through the terminal block, and the at least one terminal is configured to be brought into contact with the power terminal according to a movement of the connector when hairpin coils are inserted in the connector, such that the driving power is applied to the hairpin coils via the power terminal.

19 Claims, 15 Drawing Sheets

MOTOR

CROSS-REFERENCE TO RELATED APPLICATION

This application claims the benefit of priority under 35 U.S.C. § 119(a) to Korean Patent Application No. 10-2019-0003467, filed on Jan. 10, 2019, the disclosure of which is incorporated by reference herein in its entirety.

BACKGROUND

1. Technical Field

The present disclosure relates to a motor, and in particular, to a motor with a simplified connection structure of a connector and a terminal.

2. Description of the Related Art

Recently, an eco-friendly hybrid vehicle having a motor in addition to an engine as a driving source for traveling a vehicle has been released as a future vehicle because of its excellent fuel efficiency.

The motor provided in the eco-friendly hybrid vehicle is a device for converting electrical energy into mechanical energy, and is provided with a stator and a rotor. The rotor is induced to rotate through electrical interaction between the stator and the rotor.

In relation to the related art motor as described above, FIG. 1 is a partially enlarged view illustrating a connection structure between a connector and a terminal of the related art motor.

As illustrated in FIG. 1, the related art motor 10 includes a housing 11, a stator 12 provided inside the housing 11, hairpin coils (not shown) inserted into the stator 12, terminals 13 connected to the hairpin coil, bus bars 14 electrically connected to the terminals 13, a connector 15 connected to the bus bars 14 to apply external power to the motor 10, and the like.

The related art motor 10 is configured so that the plurality of bus bars 14 electrically connect the terminals 13, to which the hairpin coils are coupled, to the connector 15, in order to receive external power through the connector 15.

However, since the related art motor 10 uses the plurality of bus bars 14 separately to receive power from the external power source, the number of components used in the motor 10 is increased and thereby the entire structure is made complicated. If used for a long time, each component is easily broken.

Due to the use of the plurality of bus bars 14, the number of components used is increased, a manufacturing process of the motor 10 extends, and a manufacturing cost is greatly increased.

In addition, it is difficult to meet the IEC international standard for an insulation distance due to the complicated structure.

In addition, the large number of components used increases copper loss which is energy loss occurred within a conductor when external power is applied. This copper loss causes heat to be generated in the bus bars 14 and the like, thereby increasing ambient temperature.

Since the temperature in the vicinity of the bus bars 14, the connector 15, and the terminals increases, each component is heated, causing the motor 10 to malfunction frequently.

SUMMARY

The present disclosure has been made to solve the above problems, and an aspect of the detailed description is to provide a motor with a simplified connection structure between a connector and a terminal.

Another aspect of the detailed description is to provide a motor with a simplified connection structure for electrically connecting a connector and a terminal by way of contacting the terminal with a power terminal of the connector or releasing the contact according to movement of the connector.

To achieve these and other advantages and in accordance with the purpose of the detailed description, as embodied and broadly described herein, there is provided a motor configured to receive driving power from a connector comprising power terminals, the motor comprising a housing, a terminal block disposed inside the housing, wherein the power terminals are configured to penetrate through the terminal block, and at least one terminal located adjacent to the terminal block. The at least one terminal may be configured to be brought into contact with the power terminal according to a movement of the connector when hairpin coils are inserted in the connector, such that the driving power is applied to the hairpin coils via the power terminal.

The at least one terminal may be configured to be fixed when a coupling member previously coupled to the power terminal is inserted in the at least one terminal according to the movement of the connector.

The terminal may comprise a body portion, insertion plates protruding as a pair from both sides of an upper portion of the body portion, wherein the hairpin coils is configured to be inserted between the insertion plates, and a fixing groove formed in a lower portion of the body portion such that the coupling member is fixedly inserted therein according to the movement of the connector.

The body portion may comprise a contact preventing portion provided on an upper end thereof, and the contact preventing portion may be located to face one end of each hairpin coil inserted between the insertion plates, to prevent contact between the hairpin coils.

The terminal block may comprise a plurality of through holes through which the power terminals are inserted, a movement groove may be formed in a lower portion of at least one of the through holes and may comprise the power terminal mounted therein, and the power terminal may be configured to be moved toward the through hole according to the movement of the connector.

The terminal block may comprise a plurality of partitions configured to partition the at least one terminal.

The terminal block may comprise guide portions on both sides of an upper portion thereof, so as to be movable in an inserted state in the housing, and the housing may comprise guide slots formed therein such that the guide portions are movably inserted therein.

An outer circumferential surface of the guide portion and an inner circumferential surface of the guide slot may be rounded.

The terminal block may comprise coupling plates formed on both sides of a lower portion thereof, and each of the coupling plates may have a coupling hole through which a coupling member is inserted. The housing may comprise coupling grooves formed inside the housing such that the coupling members inserted through the coupling holes are coupled to the housing.

The coupling plate may comprise a removed part located at a side of the hairpin coil.

At least one of the power terminals may be connected with a terminal module and may be configured to connect the power terminal and the hairpin coils to each other.

The terminal module may comprise a first terminal fixed to the power terminal through a coupling member, a terminal connection member comprising a first connection portion having one end inserted into the first terminal, and a second connection portion bent and extending from the first connection portion to be inserted into a second terminal, and a second terminal comprising a first insertion portion having an insertion hole in which the first connection portion is configured to be inserted, and a second insertion portion having upper and lower sides into which the hairpin coils are inserted.

A motor according to one embodiment of the present disclosure may comprise a housing having an inner accommodation space, and a stator provided with a stator core and hairpin coils wound around the stator core, the stator being disposed in the accommodation space.

The motor may further comprise a terminal disposed on one side of the stator, and electrically connected to the hairpin coil, a power terminal extending through the housing, and having a coupling member coupled to one end thereof facing inside of the housing, and a terminal block having a through hole through which the power terminal is inserted, the terminal block being coupled to an inner surface of the housing on one side of the stator core.

The terminal may comprise a fixing groove formed in one end thereof, and the fixing groove may be open in a direction facing the stator. The through hole may comprise a movement groove in a side thereof facing the stator, and the movement groove may be configured to allow the coupling member to be movable in a direction toward the fixing groove or away from the fixing groove.

The coupling member may be configured to be moved in the direction toward the fixing groove to be inserted into the fixing groove.

The motor may comprise a plurality of through holes and a plurality of power terminals, and the movement groove may be formed in a side, facing the stator, of at least one of the through holes.

The motor may comprise a plurality of terminals, and the terminal block may comprise partitions protruding from one surface thereof facing the inside of the housing. The partitions may be configured to be disposed between the plurality of terminals.

The terminal block may comprise guide portions protruding from both ends of one surface thereof opposite to the stator, and the housing may comprise guide slots formed in the inner surface thereof so that the guide portions are slid therein.

The terminal block may comprise coupling plates formed on both ends of one surface thereof facing the stator, and the coupling plates may have coupling holes through which coupling members are inserted. The housing may comprise coupling grooves, and each coupling groove may be formed in an inner surface thereof such that the coupling member inserted through the coupling hole is coupled thereto.

Across-sectional area of the coupling hole may be smaller than a cross-sectional area of a portion of the coupling member inserted through the coupling hole.

As described above, in a motor according to the present disclosure, a connector and a terminal can be directly connected to each other without use of a bus bar, which may result in simplifying a connection structure for receiving external driving power.

Without the use of the bus bar, the number of components constructing the motor can be reduced, thereby simplifying the structure.

Since the number of components used is reduced, a manufacturing cost can be reduced and a manufacturing time can be shortened.

Without the use of the bus bar, copper loss caused when applying external driving power can be minimized.

Since the copper loss is minimized, heat generation caused due to the copper loss can be prevented.

Since the terminal is connected using a terminal block and a connector, the connection structure can be simplified and simultaneously an insulation specification can be satisfied.

DETAILED DESCRIPTION OF THE EMBODIMENT

Hereinafter, description will be given in detail of a motor according to one embodiment of the present disclosure, with reference to the accompanying drawings.

Figure 1:
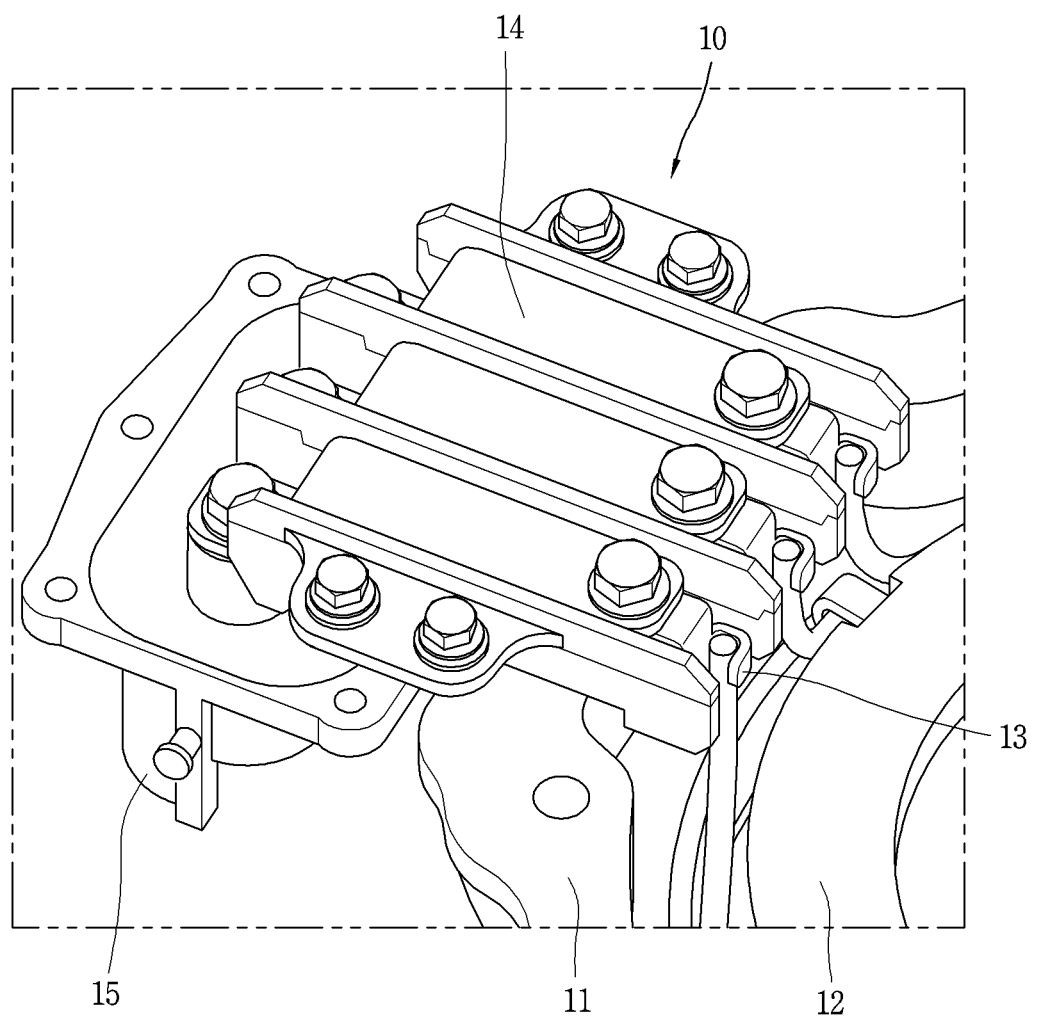
FIG. 1 is a partially-enlarged view illustrating a state in which terminals are connected to a connector through bus bars in the related art motor.
Figure 2:
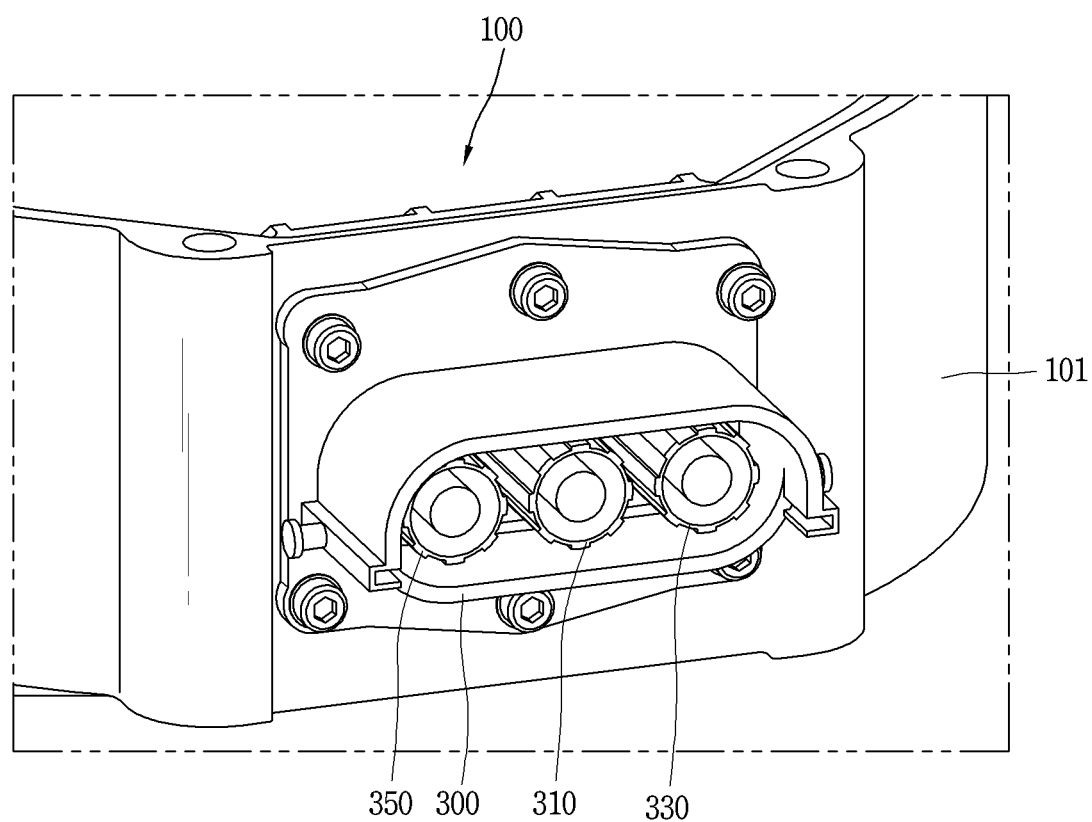
FIG. 2 is a perspective view illustrating a connected state of a connector in a motor in accordance with an embodiment of the present disclosure.
Figure 3:
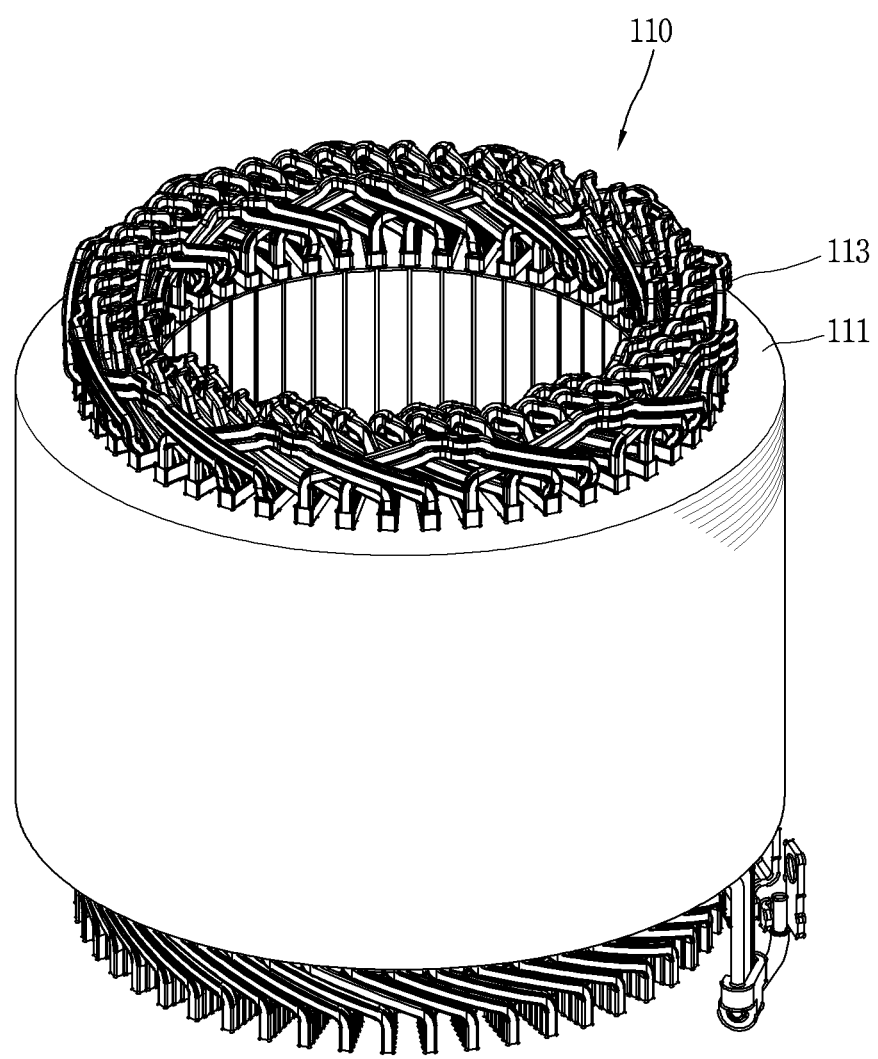
FIG. 3 is a perspective view illustrating a state in which a terminal and a terminal module are connected to a stator provided in a motor in accordance with an embodiment of the present disclosure.
Figure 4:
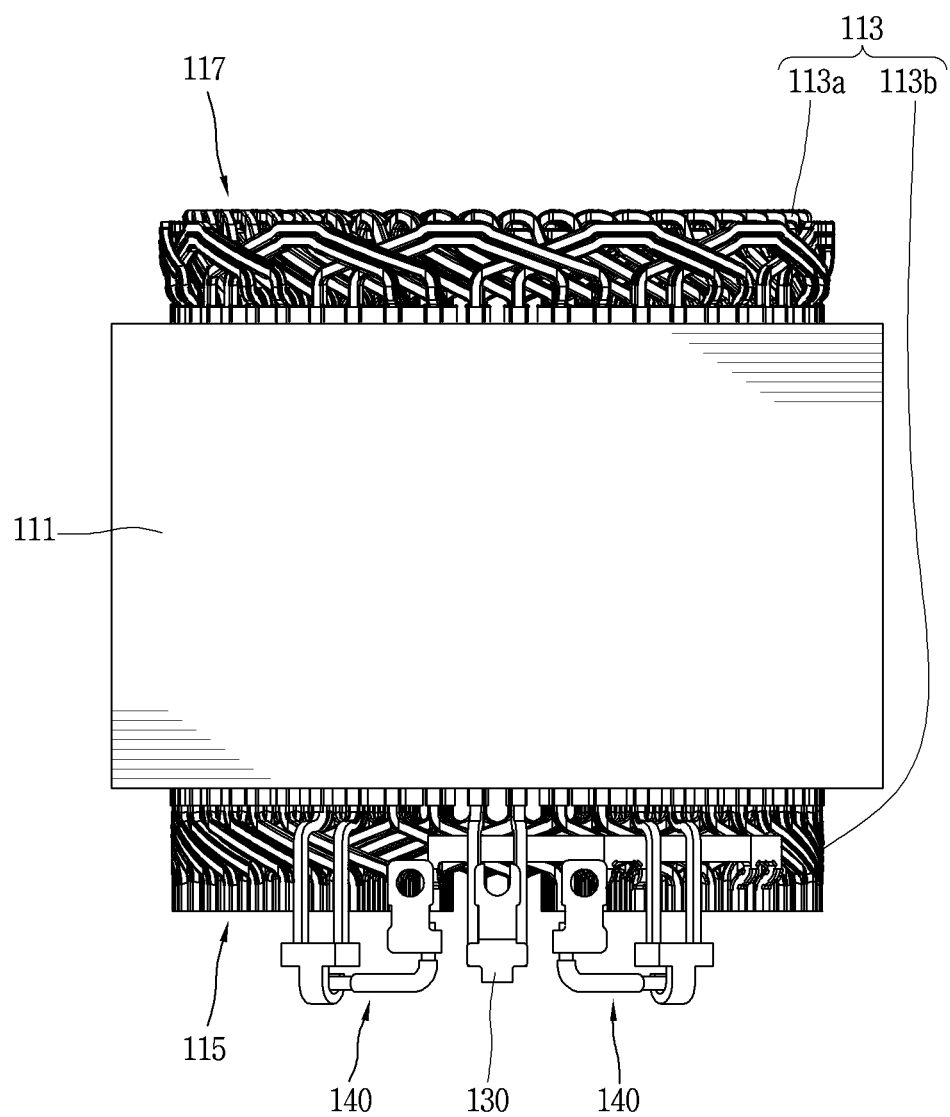
FIG. 4 is a lateral view illustrating the state in which a terminal and a terminal module are connected to a stator provided in a motor in accordance with an embodiment of the present disclosure.
Figure 5:
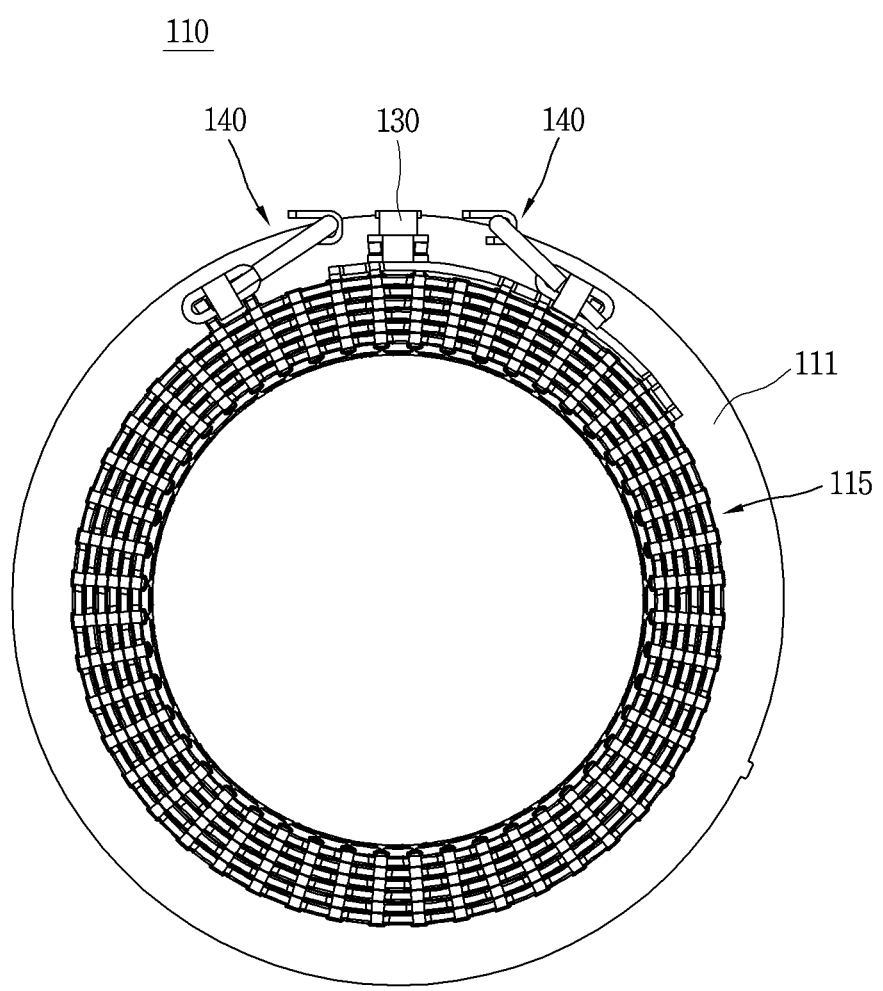
FIG. 5 is a front view illustrating the state in which a terminal and a terminal module are connected to a stator provided in a motor in accordance with an embodiment of the present disclosure.

FIG. 2 is a perspective view illustrating a connected state of a connector in a motor in accordance with an embodiment of the present disclosure, FIG. 3 is a perspective view illustrating a state in which a terminal and a terminal module are connected to a stator provided in the motor in accordance with an embodiment of the present disclosure, FIG. 4 is a lateral view illustrating a state in which the terminal and the terminal module are connected to the stator provided in the motor in accordance with an embodiment of the present disclosure, and FIG. 5 is a front view illustrating a state in which the terminal and the terminal module are connected to the stator provided in the motor in accordance with an embodiment of the present disclosure.

As illustrated in FIGS. 2 to 5, a motor 100 according to an embodiment disclosed herein may be connected with a connector 300 comprising power terminals 310, 330, and 350 to which power of three phases, namely, U phase, V phase, and W phase is applied, and may receive external three-phase driving power through the power terminals 310, 330, and 350 of the connector 300.

In this case, the motor 100 may comprise a housing 101, a stator 110 provided inside the housing 101, and a rotor (not shown) located inside the stator 110.

The housing 101 may provide an accommodation space in which the stator 110 and the rotor can be accommodated, and may be made of aluminum or the like having excellent thermal conductivity.

In addition, a housing cover 103 may be coupled to the housing 101.

The housing cover 103 may be formed in a cylindrical shape having an open bottom surface and may be coupled to an open top surface of the housing 101.

The stator 110 may be provided on an inner circumferential surface of the housing 101, and may form a magnetic field.

Here, the stator 110 may comprise a stator core 111 and hairpin coils 113.

The stator core 111 may be provided on an inner circumferential surface of the housing 101 and may have a shape like "H" when viewed in a planar view. The stator core 111 may be formed by stacking a plurality of steel sheets in a shape like "H" with a thin thickness, or may be formed in a shape of a circular ring or the like.

The stator core 111 may be provided with a plurality of slots 112.

The slots 112 may be radially arranged in the stator core 111, and the hairpin coils 113 may be inserted into the slots 112 in an overlapping manner.

At this time, when the hairpin coil 113 is inserted into the slot 112, both sides of the hairpin coil 113 may protrude out of the stator core 111 to form an end coil 117 and an end turn 115, respectively.

In detail, the hairpin coil 113 may be provided in plurality. The plurality of hairpin coils 113 may be coupled to the slots 112 to form windings.

The hairpin coil 113 may be formed in a U-like or V-like shape.

Here, the hairpin coil 113 may be provided with a pair of insertion portions 113a inserted into the slots 112, and a bent portion 113a formed between the insertion portions 113b in a bending manner.

The pair of insertion portions 113b may be inserted into the slots 112 and then exposed to outside of the stator 110 so as to form the end turn 115. And a terminal block 120 and a terminal 130 to be explained later may be located adjacent to the end turn 115.

The bent portion 113a may be exposed outside the stator 110 when the insertion portions 113b of the hairpin coil 113 are inserted into the slots 112, thereby forming the end coil 117.

The rotor may be located inside the stator 110 and may rotate while interacting with a magnetic field formed in the stator 110.

Figure 6:
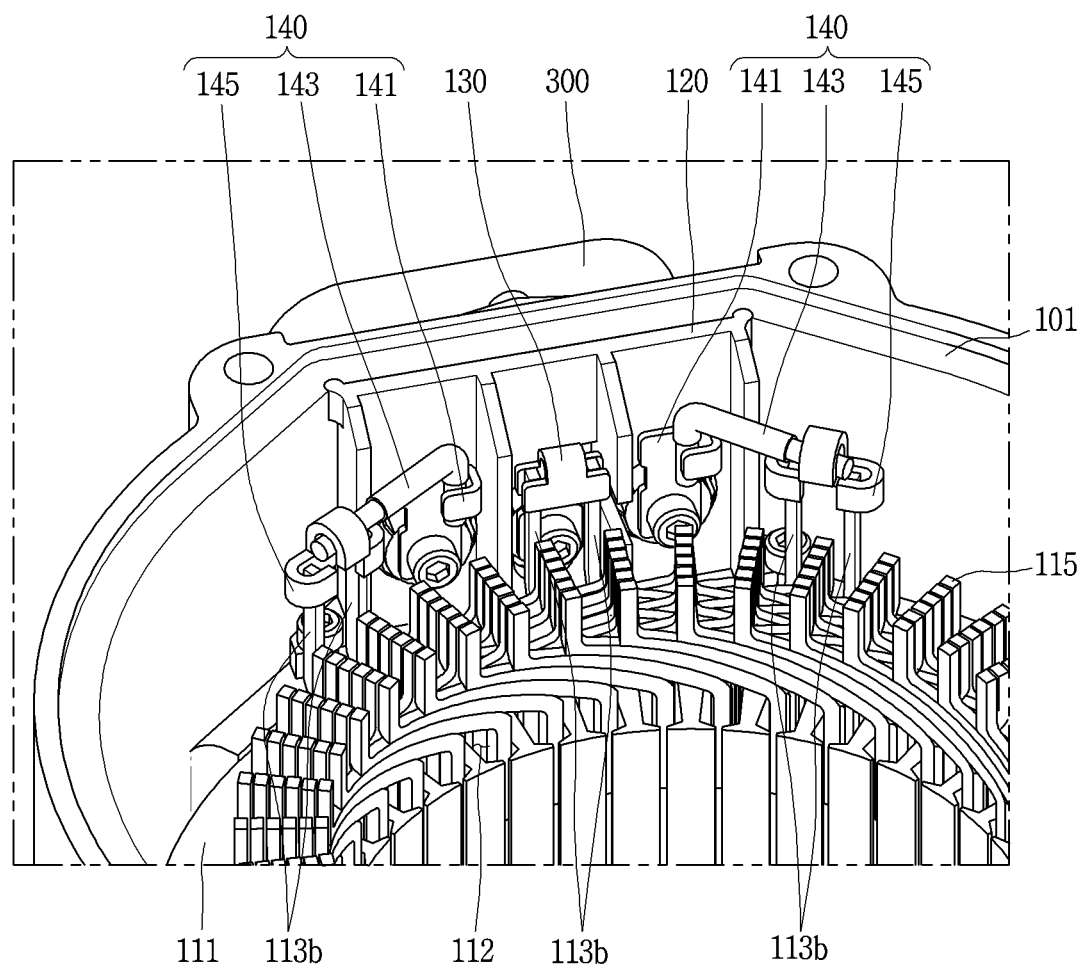
FIG. 6 is a partially-enlarged view illustrating a state in which a terminal and a terminal module are connected to power terminals of a connector in a motor in accordance with an embodiment of the present disclosure.
Figure 7:
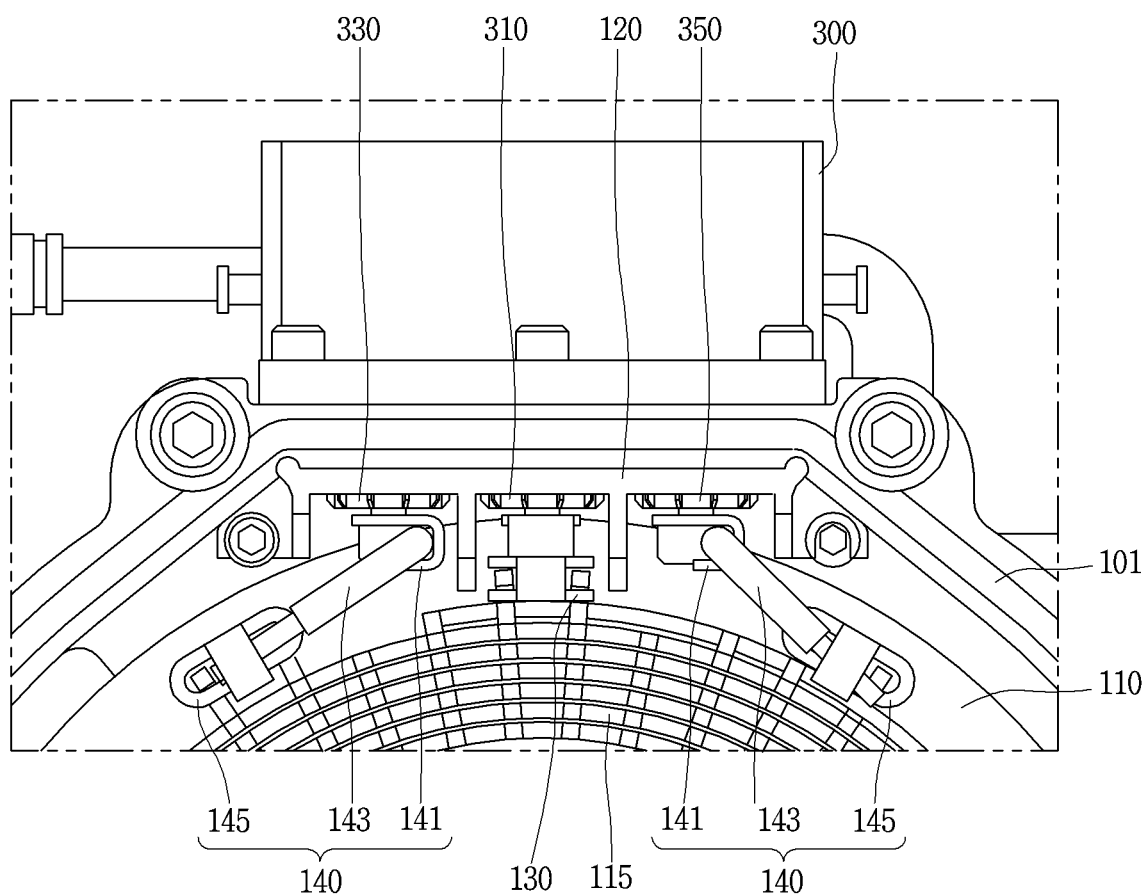
FIG. 7 is another partially-enlarged view illustrating a state in which a terminal and a terminal module are connected to power terminals of a connector in a motor in accordance with an embodiment of the present disclosure.
Figure 8:
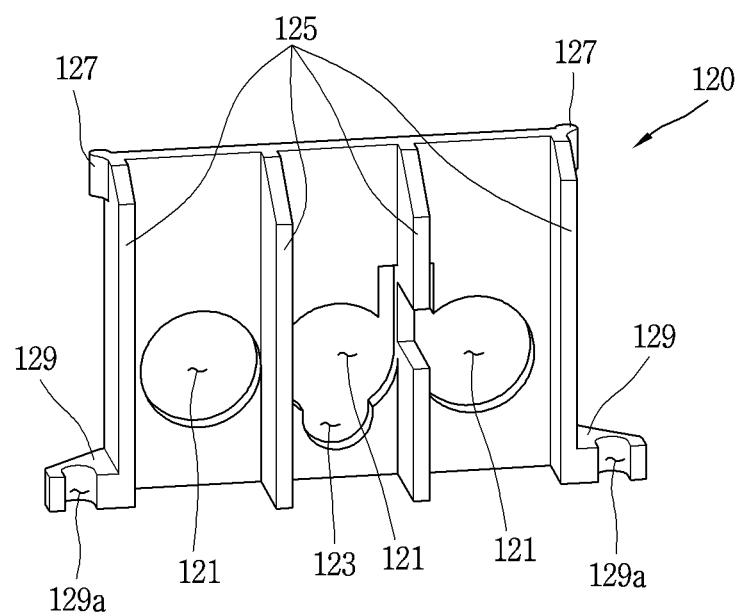
FIG. 8 is a perspective view illustrating a terminal block provided in a motor in accordance with an embodiment of the present disclosure.
Figure 9:
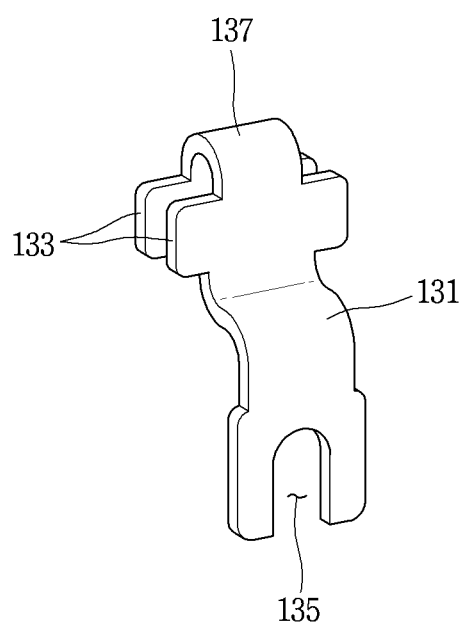
FIG. 9 is a perspective view illustrating a terminal provided in a motor in accordance with an embodiment of the present disclosure.
Figure 10:
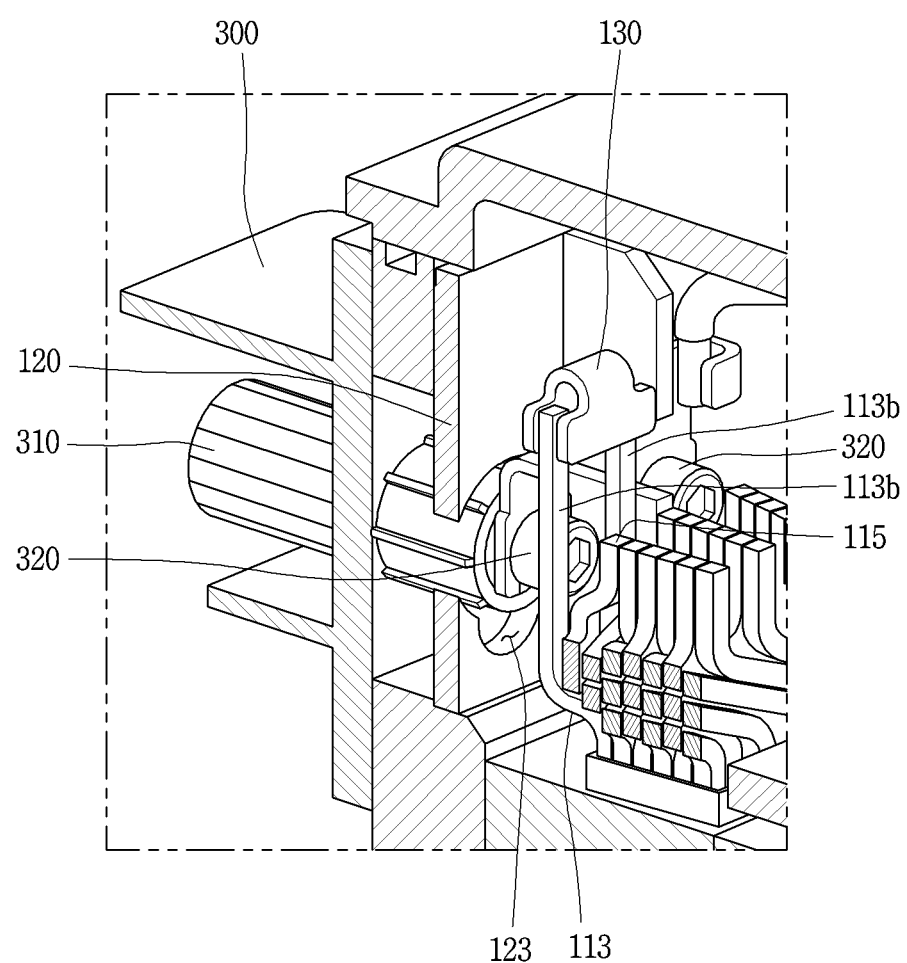
FIG. 10 is a partial sectional view illustrating a state in which a terminal and a terminal module are connected to a power terminal of a connector in a motor in accordance with an embodiment of the present disclosure.

Meanwhile, FIG. 6 is a partially-enlarged view illustrating a state in which the terminal and the terminal module are connected to power terminals of a connector in the motor in accordance with an embodiment of the present disclosure, FIG. 7 is another partially-enlarged view illustrating a state in which the terminal and the terminal module are connected to the power terminals of the connector in the motor in accordance with an embodiment of the present disclosure, FIG. 8 is a perspective view illustrating a terminal block provided in the motor in accordance with an embodiment of the present disclosure, FIG. 9 is a perspective view illustrating the terminal provided in the motor in accordance with an embodiment of the present disclosure, and FIG. 10 is a partial sectional view illustrating a state in which the terminal and the terminal module are connected to the power terminals of the connector in the motor in accordance with an embodiment of the present disclosure.

As illustrated in FIGS. 6 to 10, the motor 100 may comprise a terminal block 120 into which the power terminals 310, 330, and 350 can be inserted so as to be electrically connected to the connector 300, and at least one terminal 130 located adjacent to the terminal block 120 to be brought into contact with the power terminal 310 which applies V-phase power.

The terminal block 120 may be fixed inside the housing 101 and may be located at a position where the power terminals 310, 330, and 350 for applying power of the three phases, namely, U, V, and W phases penetrate through the terminal block 120.

The terminal block 120 may be provided with a plurality of through holes 121 through which the power terminals 310, 330, and 350 are inserted.

Here, a movement groove 123 may be formed in a lower portion of one of the through holes 121, in which the power terminal 310 for the V-phase power is mounted. As the connector 300 is moved, the power terminal 310 may be moved toward the through hole 121 by the movement groove 123.

Therefore, when the connector 300 is moved toward the through hole 121 in the state that the power terminal 310 has been mounted in the movement groove 123, a coupling member 320 previously coupled to the power terminal 310 may be inserted into the terminal 130 in which the insertion portions 113b have already been inserted. Accordingly, the terminal 130 may be brought into contact with the power terminal 310 and may be simultaneously fixed to the coupling member 320, so as to be electrically connected to the connector 300.

This embodiment exemplarily illustrates that the movement groove 123 is formed in the lower portion of the one of the through holes 121. However, this is merely illustrative and the present disclosure is not necessarily limited thereto.

For example, the movement groove 123 may be formed in the lower portion of each of the through holes 121.

In addition, the terminal block 120 may further be provided with a plurality of partitions 125 by which the terminal 130 can be located in a partitioned space.

The partitions 125 may divide one surface of the terminal block 120 into a plurality of surfaces (or spaces).

Here, the through holes 121 may be formed through the respective surfaces of the terminal block 120 divided by the partitions 125. The terminal 130 may be provided by at least one to be adjacent to each surface of the terminal block 120 divided by the partitions 125.

In this case, the partitions 125 can secure insulating distances between the adjacent terminals 130.

The terminal 130 may be located adjacent to the terminal block 120, and the insertion portions 113b of the hairpin coil 113 may be inserted into the terminal 130.

Here, the connector 300 which has been connected to an external driving power source may apply a three-phase driving signal having a U phase, a V phase, and a W phase to the terminal 130. The insertion portions 113b may be coupled to the slots 112 to correspond to each phase and then inserted into the terminal 130 for each phase.

On the other hand, the terminal 130 may be located adjacent to the power terminal 310 for applying the V-phase power, among the power terminals 310, 330, and 350. Accordingly, as the connector 300 is moved, the terminal 130 may be brought into contact with the power terminal 310 and simultaneously the coupling member 320 previously-coupled with the power terminal 310 may be inserted into the terminal 130 so that the terminal 130 can be fixed in the contact state with the power terminal 310.

Explaining this structure in detail, in the related art case, when desiring to connect the terminal 130 to the power terminal 310 of the connector 300, a separate bus bar was used for such connection. However, if the separate bus bar is used, the entire structure of the motor 100 may be made complicated and an occurrence rate of copper loss of AC power may be increased.

However, according to the configuration of the present disclosure, the terminal 130 can be connected directly to the power terminal 310 by the movement of the connector 300, without the use of the bus bar.

That is, the terminal block 120 may be fixed to the housing 101 in the state that the insertion portions 113b of the hairpin coil 113 corresponding to each phase are inserted into the terminal 130. The power terminal 310 may apply power of the V phase to the coupling member 320 through the movement groove 123. Then, the connector 300 may be moved in a direction that the terminal 130 is located. Accordingly, the coupling member 320 may be fixedly inserted into the lower portion of the terminal 130 so that the terminal 130 is electrically connected to the connector 300. Accordingly, external driving power can be introduced into the motor 100 for each phase through the terminal 130 and the hairpin coils 113 via the connector 130.

This embodiment exemplarily illustrates the configuration that the terminal 130 is provided on the power terminal 310, which applies the V-phase power, located in the terminal block. However, this is merely illustrative and the present disclosure is not necessarily limited thereto.

For example, the terminal 130 may be provided on each of the power terminals 310, 330, and 350 for each of the U phase, the V phase, and the W phase divided by the partitions 125.

Meanwhile, the terminal 130 may comprise a body portion 131, insertion plates 133, and a fixing groove 135.

The body portion 131 may be adjacent to the terminal block 120 and may be formed to have a central portion curved.

The insertion plates 133 may protrude as a pair from an upper portion of the body portion 131 to both sides so as to face each other in a spaced state. The insertion portions 113b of the hairpin coil 113 may be inserted between the insertion plates 133.

The fixing groove 135 may be formed in a lower portion of the body portion 131. The coupling member 320 previously coupled to the power terminal 310 may be fixedly inserted into the fixing groove 135 according to the movement of the connector 300.

Here, a contact preventing portion 137 may be further formed on an upper end of the body portion 131.

The contact preventing portion may integrally connect the pair of insertion plates 133 to each other and simultaneously prevent the contact between the insertion portions 113b by being located to face one end of each insertion portion 113b inserted between the insertion plates 133.

Figure 11:
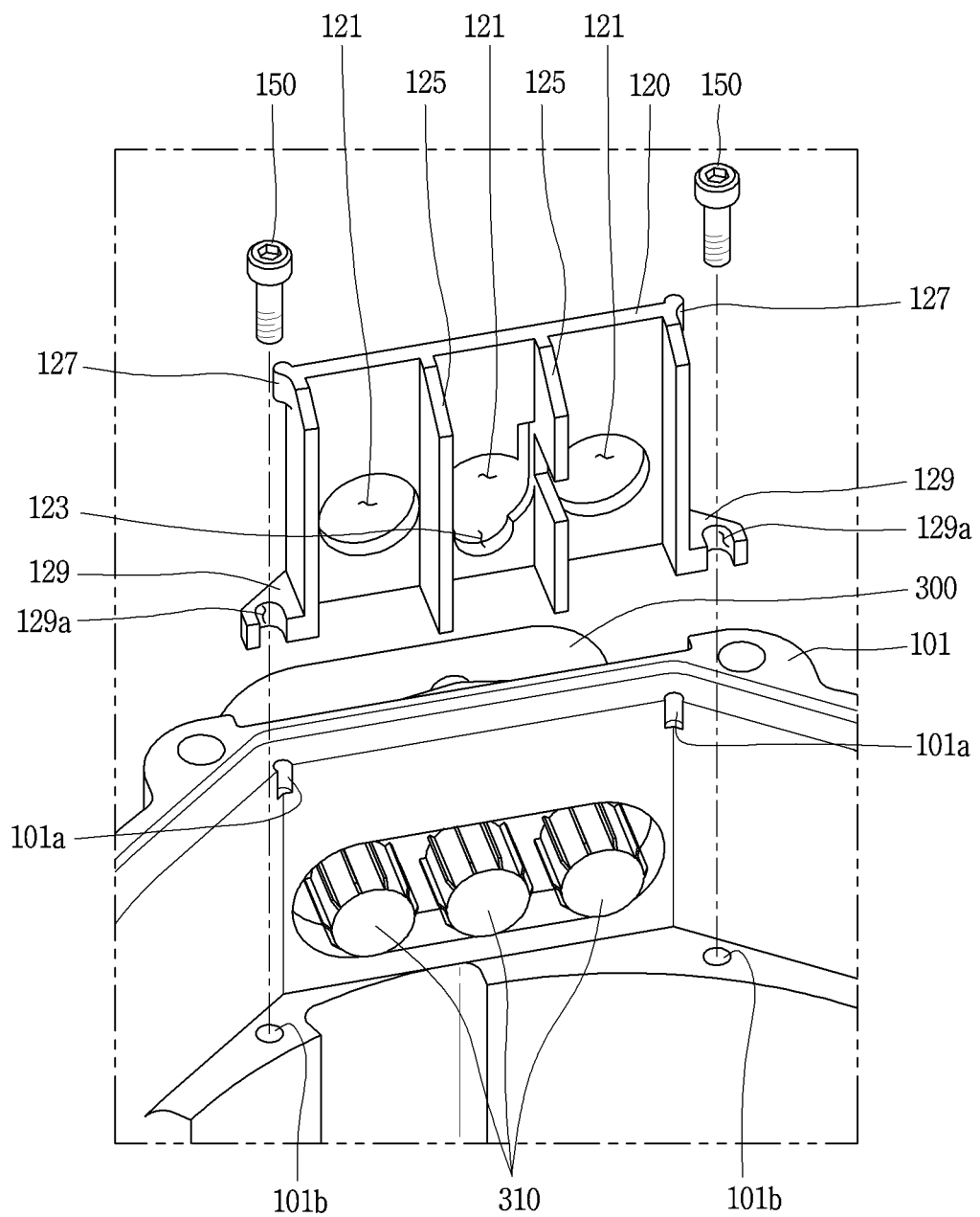
FIG. 11 is an exploded perspective view illustrating a state in which a terminal block is separated from a motor in accordance with an embodiment of the present disclosure.
Figure 12:
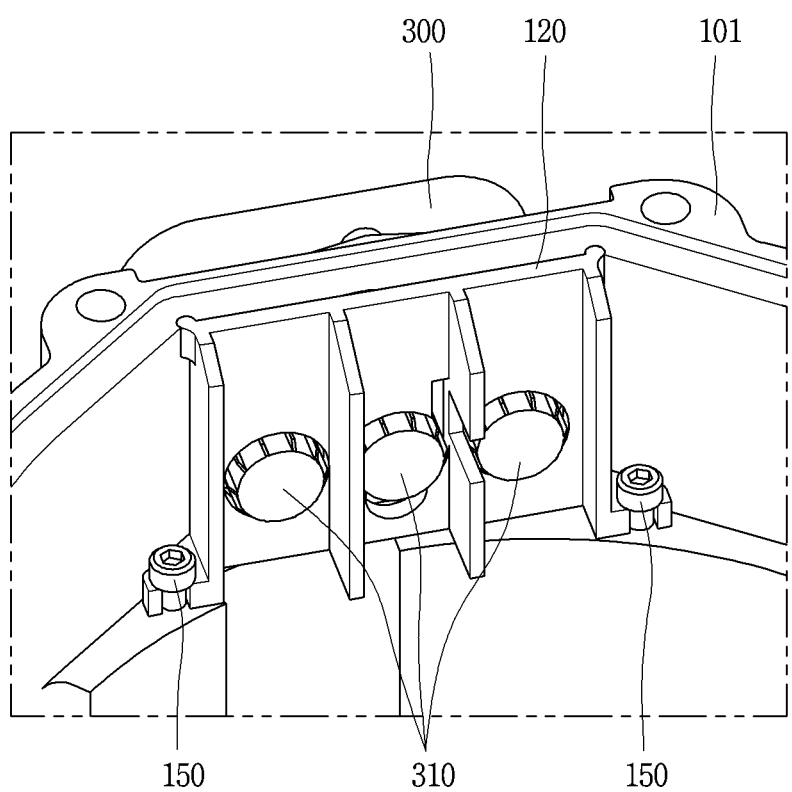
FIG. 12 is a partially-enlarged view illustrating a state in which a terminal block is coupled to a motor in accordance with an embodiment of the present disclosure.

On the other hand, FIG. 11 is an exploded perspective view illustrating a state in which the terminal block is separated from the motor in accordance with an embodiment of the present disclosure, and FIG. 12 is a partially enlarged view illustrating a state in which the terminal block is coupled to the motor in accordance with an embodiment of the present disclosure.

As illustrated in FIGS. 11 and 12, guide portions 127 may be formed on both sides of an upper portion of the terminal block 120.

The guide portions 127 may be formed on the both sides of the upper portion of the terminal block 120 to allow the terminal block 120 to be moved with being inserted inside the housing 101.

In addition, guide slots 101a may be formed in the housing 101.

The guide slots 101a may be located inside the housing 101 to correspond to the guide portions 127 and allow the guide portions 125 to be movable in the inserted state therein. Accordingly, the terminal block 120 can be coupled to the housing 101 in a close contact with an inner circumferential surface of the housing 101.

Here, an outer circumferential surface of the guide portion 127 and an inner circumferential surface of the guide slot 101a may be rounded.

Since the outer circumferential surface of the guide portion 127 and the inner circumferential surface of the guide slot 101a may be rounded, damage caused due to friction on contact surfaces of the guide portion 127 and the guide slot 101a, which occurs when the guide portion 127 is moved in the inserted state in the guide slot 101a, can be prevented.

In addition, the terminal block 120 may be provided with coupling plates 129.

The coupling plates 129 may be formed on both sides of a lower portion of the terminal block 120 to allow the terminal block 120 to be fixed to the housing 101.

Here, each of the coupling plates 129 may be provided with a coupling hole 129a.

The coupling hole 129a may be formed through the coupling plate 129 in an up and down direction, and a coupling member 150 such as a bolt or the like may be inserted through the coupling hole 129*a*.

In addition, coupling grooves 101*b* may be formed inside the housing 101.

The coupling groove 101*b* may be located to correspond to the coupling hole 129*a*. Accordingly, the coupling member 150 may be inserted through the coupling hole 129*a* and then coupled to the coupling groove 101*b*. This may allow the terminal block 120 to be fixed inside the housing 101.

On the other hand, the coupling plate 129 may be formed such that a part thereof at a side of the hairpin coil 113 is removed.

Since the coupling plate 129 may be formed with the part removed, a space occupied by the coupling plate 129 inside the housing 101 can be reduced and an insulating distance from other components can be sufficiently ensured.

Figure 15:
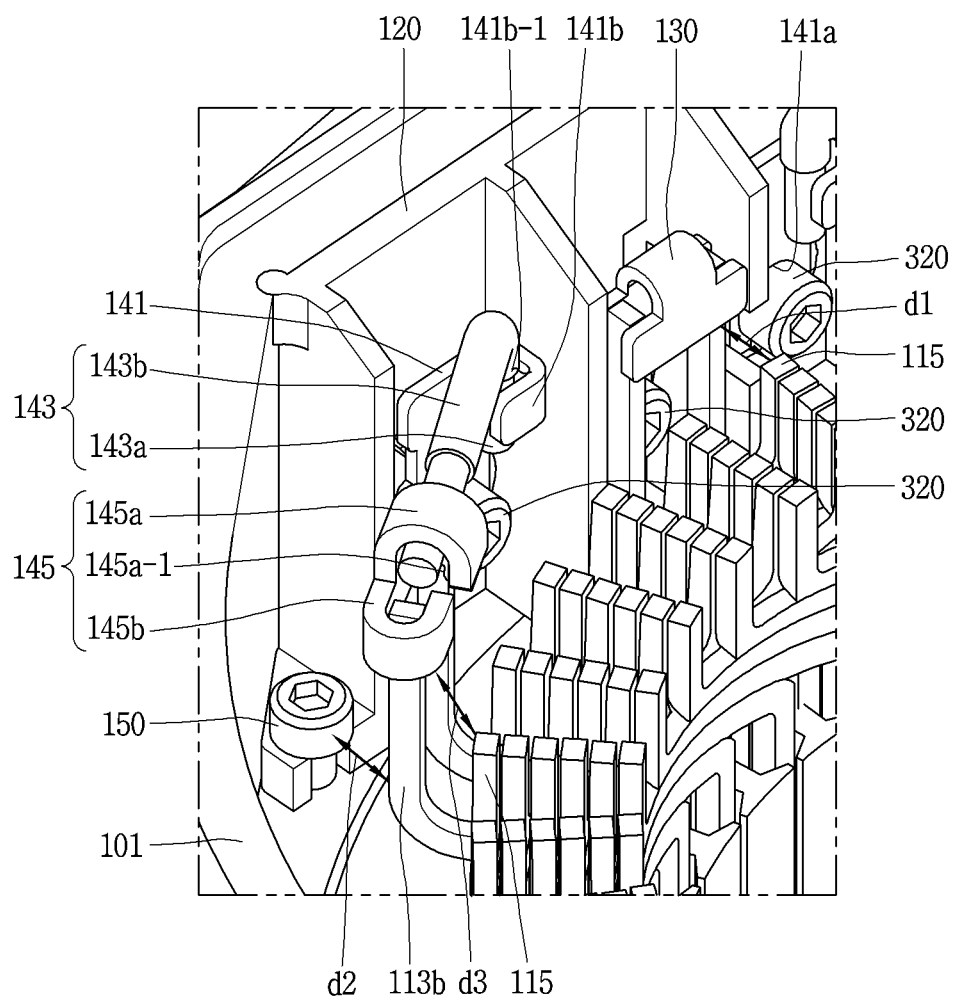
FIG. 15 is a partially-enlarged view illustrating clearance distances among components in a motor in accordance with an embodiment of the present disclosure.

On the other hand, as illustrated in FIG. 15, terminal modules 140 may be connected to the power terminals 330 and 350 for applying U-phase power and W-phase power so as to connect the power terminals 330 and 350 to the hairpin coils 113.

This embodiment exemplarily illustrates the configuration that the terminal modules 140 are connected to the power terminal 330 applying the U-phase power and the power terminal 350 applying the W-phase power, respectively. However, this is merely illustrative and the present disclosure is not necessarily limited thereto.

For example, the terminal module 140 may be connected only to the power terminal 330 applying the U-phase power and the terminals 130 may be connected to the power terminal 310 applying the V-phase power and the power terminal 350 applying the W-phase power, respectively.

As another example, the terminal module 140 may be connected only to the power terminal 350 applying the W-phase power and the terminals 130 may be connected to the power terminal 330 applying the U-phase power and the power terminal 310 applying the V-phase power.

On the other hand, the terminal module 140 may comprise a first terminal 141, a terminal connection member 143, and a second terminal 145.

The first terminal 141 may be fixed to the power terminal 330, 350 through the coupling member 320 while being in close contact with the power terminal 330, 350.

Here, the first terminal 141 may be provided with a first terminal coupling hole 141*a*.

The first terminal coupling hole 141*a* may be formed through the first terminal 141. The coupling member 320 such as a bolt or the like may be inserted through the first terminal coupling hole 141*a* in a state that one surface of the first terminal 141 is in contact with the power terminal 330, 350. Accordingly, the first terminal 141 can be fixed to the power terminal 330, 350 in the close contact state so as to be electrically connected to the power terminal 330, 350.

In addition, the first terminal 141 may be provided with a bent portion 141*b* defining an insertion space 141*b*-1 into which a first connection portion 143*a* to be described later can be inserted.

The bent portion 141*b* may define the insertion space 141*b*-1 in which the first connection portion 143*a* can be inserted.

Therefore, the first connection portion 143*a* may be inserted into the insertion space 141*b*-1 defined by the bent portion 141*b*, so that the first terminal 141 can be connected to the terminal connection member 143.

The terminal connection member 143 may electrically connect the first terminal 141 and the second terminal 145 to each other.

Here, the terminal connection member 143 may comprise a first connection portion 143*a* and a second connection portion 143*b*.

One end of the first connection portion 143*a* may be inserted into the first terminal 141, and another end may be integrally formed with the second connection portion 143*b*.

The second connection portion 143*b* may be bent and extend from the first connection portion 143*a*, and may be inserted into an insertion hole 145*a*-1 to be described later so as to be connected to the second terminal 145.

The second terminal 145 may be electrically connected to the first terminal 141 by the terminal connection member 143.

Here, the second terminal 145 may comprise a first insertion portion 145*a* and a second insertion portion 145*b*.

The first insertion portion 145*a* may be provided with an insertion hole 145*a*-1 defined thereby in a direction orthogonal to the insertion portion 113*b* of the hairpin coil 113, and the second connection portion 143*b* may be inserted into the insertion hole 145*a*-1.

The second insertion portion 145*b* may be integrally formed with the first insertion portion 145*a* and have upper and lower sides open so that the insertion portion 113*b* of the hairpin coil 113 is inserted.

Figure 13:
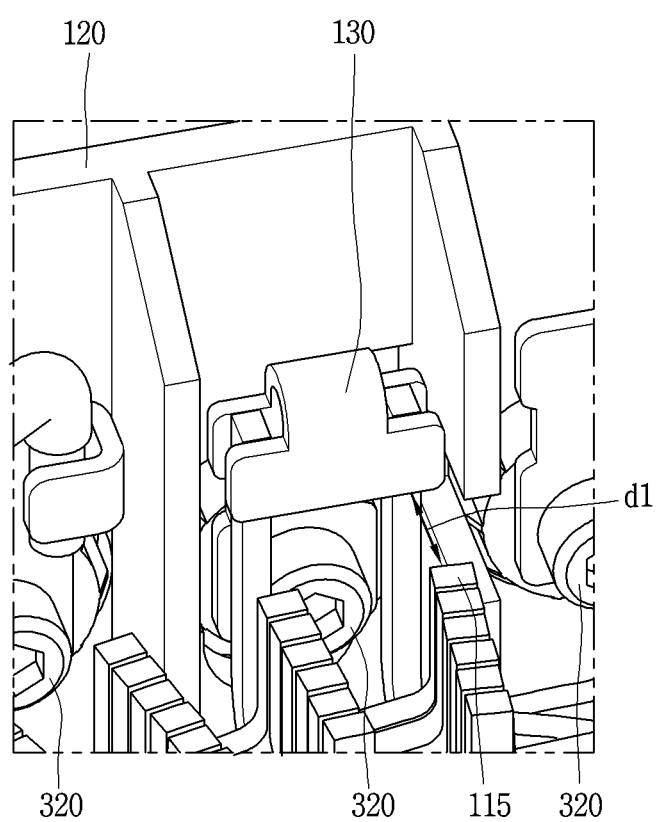
FIG. 13 is a partially-enlarged view illustrating a clearance distance between a terminal and an end turn in a motor in accordance with an embodiment of the present disclosure.
Figure 14:
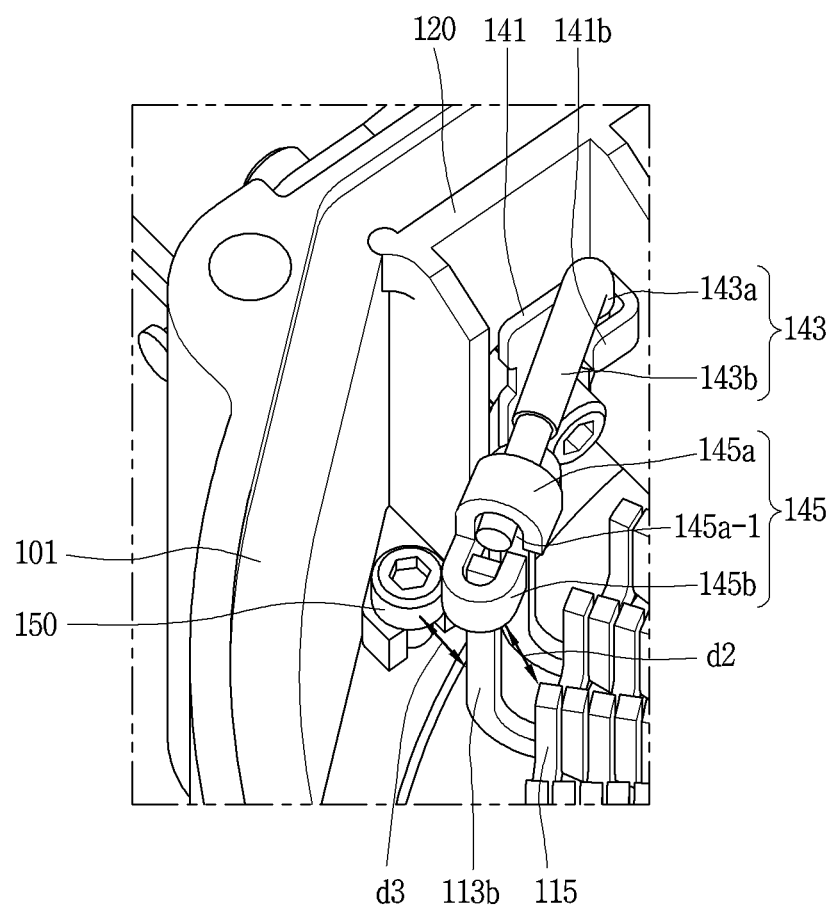
FIG. 14 is a partially-enlarged view illustrating a clearance distance between a housing and an end coil in a motor in accordance with an embodiment of the present disclosure.
Figure 16:
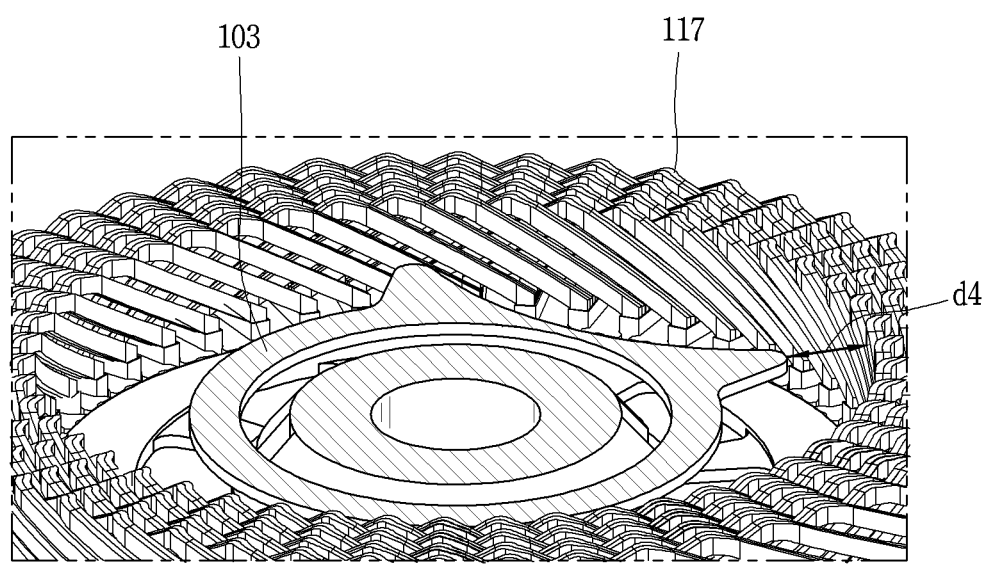
FIG. 16 is a partially-enlarged view illustrating a clearance distance between a housing cover and an end coil in a motor in accordance with an embodiment of the present disclosure.

On the other hand, FIG. 13 is a partially-enlarged view illustrating a clearance distance between the terminal and the end turn in the motor in accordance with an embodiment of the present disclosure, FIG. 14 is a partially-enlarged view illustrating a clearance distance between the housing and the end coil in the motor in accordance with an embodiment of the present disclosure, FIG. 15 is a partially-enlarged view illustrating a clearance distance among components in the motor in accordance with an embodiment of the present disclosure, and FIG. 16 is a partially-enlarged view illustrating a clearance distance between the housing cover and the end coil in the motor in accordance with an embodiment of the present disclosure.

As illustrated in FIGS. 13 to 16, the motor 100 according to an embodiment can connect the terminal 130 to the power terminal 310 by moving the connector 300 in the state where the terminal block 120 is located inside the housing 101, instead of using a bus bar for connection. Therefore, the connection structure can be simplified, and a clearance distance and a creepage distance can satisfy the IEC international standard.

Explaining this structure in detail, the IEC international standard specifies the configuration related to a wiring terminal part, for example, the configuration that a clearance distance is 9.1 mm or greater and a creepage distance is 12 mm or greater between the adjacent terminals 130 or between the terminal 130 and the housing 101, in an 800-V high-voltage motor system.

The IEC international standard also specifies the configuration of other components except for the wiring terminal part, for example, the configuration that a clearance distance is 5.6 mm or greater and a creepage distance is 8.0 mm or greater between the end coil 117 and the housing 101 or between the end coil 117 and the housing cover 103.

In the present disclosure, a clearance distance d1 between the terminal 130 and the end turn 115 may be 9.211 mm as illustrated in FIG. 13. Also, as illustrated in FIGS. 14 and 15, a clearance distance d2 between the second terminal 145 and the end turn 115 may be 9.133 mm and a clearance distance d3 between the hairpin coil 113 and the housing 101 may be 9.575 mm.

In addition, as illustrated in FIG. 16, a clearance distance d4 between the housing cover 103 and the end coil 117 may be 10.573 mm. Therefore, the configuration according to the present disclosure can satisfy the clearance distance and the creepage distance specified in the IEC international standard.

This embodiment exemplarily illustrates that the clearance distance d1 between the terminal 130 and the end turn 115, the clearance distance d2 between the second terminal 145 and the end turn 115, the clearance distance d3 between the hairpin coil 113 and the housing 101, and the clearance distance d4 between the housing cover 103 and the end coil 117 are set to 9.211 mm, 9.133 mm, 9.575 mm, and 10.573 mm, respectively. However, this is merely illustrative and the present disclosure is not necessarily limited thereto.

For example, the clearance distance d1 between the terminal 130 and the end turn 115 may be set differently from this embodiment disclosed herein while satisfying the IEC international standard, by way of properly adjusting the size and the like of the terminal 130.

According to the present disclosure having the configuration, the power terminal 310, 330, 350 of the connector 300 and the terminal 130 can be electrically connected directly to each other, without use of a bus bar, which may result in simplifying the connection structure for providing external driving power.

In addition, since the power terminal 310, 330, 350 of the connector 300 and the terminal 130 can be directly connected without using the bus bar, the overall structure of the motor 100 may be simplified.

In addition, since the power terminal 310, 330, 350 of the connector 300 and the terminal 130 can be directly connected without using the bus bar, the number of components used may be reduced, and the manufacturing cost may be reduced.

In addition, without using the bus bar, the number of components used for connecting the connector 300 and the terminal 130 can be reduced, which may result in decreasing copper loss occurred when applying driving power.

In addition, since the copper loss occurred when applying driving power can be decreased, heat generation caused due to the copper loss can be minimized (prevented).

In addition, since the pair of insertion plates 133 can be formed in the terminal 130, the insertion portion 113b of the hairpin coil 113 can be easily connected to the terminal 130 even in a narrow space.

In addition, the movement groove 123 may be formed in at least one of the through holes 121 formed through the connector 300, and the coupling member 320 may be inserted into the terminal 130 while moving in the movement groove 123 so as to allow an electric connection between the connector 300 and the terminal 130. This may allow the connector 300 and the motor 100 to be connected through such a simple structure even without using the bus bar.

Since the fixing groove 135 can be formed in the lower portion of the terminal 130, the coupling member 320 coupled to the power terminal 310 of the connector 300 can be easily connected to the terminal 300 according to the movement of the connector 300.

Since the terminal 130 can be in contact with or separated from the power terminal 310, 330, and 350 as the terminal 300 moves in the state in which the terminal block 120 is in close contact with the inside of the housing 101, the connection structure for providing external driving power can be simplified, thereby ensuring a sufficient insulating distance required between adjacent components.

In addition, the terminal block 120 can be provided with the plurality of partitions 125 to divide it for each phase, thereby ensuring sufficient insulating distances among the terminals 130 provided for each phase.

So far, the preferred embodiment disclosed herein has been described, but various modifications, changes and equivalents may be used. Also, the preferred embodiment may be appropriately modified and applied in the same manner. Therefore, it will be understood that the foregoing description does not limit the scope of the disclosure as defined by the limitations of the following claims.

What is claimed is:

1. A motor configured to receive driving power from a connector including power terminals, the motor comprising:
   a housing;
   a terminal block disposed inside the housing, wherein the power terminals are configured to penetrate through the terminal block; and
   at least one terminal located adjacent to the terminal block, wherein the at least one terminal is configured to be brought into contact with the power terminal according to a movement of the connector when hairpin coils are inserted in the connector, so that the driving power is applied to the hairpin coils via the power terminal,
   wherein the at least one terminal is configured to be fixed when a coupling member previously coupled to the power terminal is inserted in the at least one terminal according to the movement of the connector, and
   wherein each of the at least one terminal comprises:
   a body portion;
   a pair of insertion plates protruding both sides of an upper portion of the body portion, wherein the hairpin coil is configured to be inserted between the insertion plates; and
   a fixing groove formed in a lower portion of the body portion so that the coupling member is fixedly inserted therein according to the movement of the connector.

2. The motor of claim 1, wherein the body portion includes a contact preventing portion on an upper end thereof, and
   wherein the contact preventing portion is located to face one end of each hairpin coil inserted between the insertion plates to prevent contact between the hairpin coils.

3. The motor of claim 1, wherein the terminal block includes a plurality of through holes through which the power terminals are inserted,
   wherein a movement groove is formed in a lower portion of at least one of the through holes, the movement groove including the power terminal mounted therein, and
   wherein the power terminal is configured to be moved toward the through hole according to the movement of the connector.

4. The motor of claim 3, wherein the terminal block includes a plurality of partitions configured to partition the at least one terminal.

5. The motor of claim 4, wherein the terminal block includes guide portions on both sides of an upper portion thereof, so as to be movable in an inserted state in the housing, and
   wherein the housing includes guide slots formed therein so that the guide portions are movably inserted therein.

6. The motor of claim 5, wherein an outer circumferential surface of the guide portion and an inner circumferential surface of the guide slot are rounded.

7. The motor of claim 5, wherein the terminal block includes coupling plates formed on both sides of a lower portion thereof, each of the coupling plates having a coupling hole through which a coupling member is inserted,
    wherein the housing includes coupling grooves, and
    wherein each of the coupling grooves is formed inside the housing so that the coupling members inserted through the coupling holes are coupled to the housing.

8. The motor of claim 7, wherein the coupling plate includes a removed part located at a side of the hairpin coil.

9. The motor of claim 1, wherein at least one of the power terminals is connected with a terminal module and configured to connect the power terminal and the hairpin coils to each other.

10. The motor of claim 9, wherein the terminal module comprises:
    a first terminal fixed to the power terminal through a coupling member;
    a terminal connection member comprising a first connection portion having one end inserted into the first terminal and a second connection portion bent and extending from the first connection portion to be inserted into a second terminal; and
    a second terminal comprising a first insertion portion having an insertion hole in which the first connection portion is configured to be inserted and a second insertion portion having upper and lower sides into which the hairpin coils are configured to be inserted.

11. A motor comprising:
    a housing having an inner accommodation space;
    a stator having a stator core and hairpin coils wound around the stator core, the stator being disposed in the accommodation space;
    a terminal disposed on one side of the stator and electrically connected to the hairpin coils;
    a power terminal extending through the housing and having a coupling member coupled to one end thereof facing an inside of the housing; and
    a terminal block having a through hole through which the power terminal is inserted, the terminal block being coupled to an inner surface of the housing on the one side of the stator,
    wherein the terminal includes a fixing groove formed in one end thereof, the fixing groove being open in a direction facing the stator, and
    wherein the through hole includes a movement groove in a side thereof facing the stator, the movement groove being configured to allow the coupling member to be movable in a direction toward the fixing groove or away from the fixing groove.

12. The motor of claim 11, wherein the coupling member is configured to be moved in the direction toward the fixing groove to be inserted into the fixing groove.

13. The motor of claim 11, further comprising a plurality of through holes and a plurality of power terminals, and
    wherein the movement groove is formed in a side of at least one of the through holes facing the stator.

14. The motor of claim 11, further comprising a plurality of terminals,
    wherein the terminal block includes partitions protruding from one surface thereof facing the inside of the housing, and
    wherein the partitions are configured to be disposed between the plurality of terminals.

15. The motor of claim 11, wherein the terminal block includes guide portions protruding from both ends of one surface thereof opposite to the stator, and
    wherein the housing includes guide slots formed in an inner surface thereof.

16. The motor of claim 15, wherein an outer circumferential surface of the guide portion and an inner circumferential surface of the guide are rounded.

17. The motor of claim 15, wherein the terminal block includes coupling plates formed on both ends of one surface thereof facing the stator, the coupling plates having coupling holes through which coupling members are inserted, and
    wherein the housing includes coupling grooves, each coupling groove being formed in an inner surface thereof so that the coupling member inserted through the coupling hole is coupled thereto.

18. The motor of claim 17, wherein a cross-sectional area of the coupling hole is smaller than a cross-sectional area of a portion of the coupling member inserted through the coupling hole.

19. A motor configured to receive driving power from a connector including power terminals, the motor comprising:
    a housing;
    a terminal block disposed inside the housing, wherein the power terminals are configured to penetrate through the terminal block; and
    at least one terminal located adjacent to the terminal block, wherein the at least one terminal is configured to be brought into contact with the power terminal according to a movement of the connector when hairpin coils are inserted in the connector, so that the driving power is applied to the hairpin coils via the power terminal,
    wherein at least one of the power terminals is connected with a terminal module and configured to connect the power terminal and the hairpin coils to each other, and
    wherein the terminal module comprises:
    a first terminal fixed to the power terminal through a coupling member;
    a terminal connection member comprising a first connection portion having one end inserted into the first terminal and a second connection portion bent and extending from the first connection portion to be inserted into a second terminal; and
    a second terminal comprising a first insertion portion having an insertion hole in which the first connection portion is configured to be inserted and a second insertion portion having upper and lower sides into which the hairpin coils are configured to be inserted.

* * * * *